United States Patent
Myers

(10) Patent No.: US 10,796,486 B2
(45) Date of Patent: Oct. 6, 2020

(54) AUGMENTED VISUALIZATION FOR MANUFACTURING

(71) Applicant: Textron Aviation Inc., Wichita, KS (US)

(72) Inventor: Jonathan Paul Myers, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 92 days.

(21) Appl. No.: 16/019,795

(22) Filed: Jun. 27, 2018

(65) Prior Publication Data

US 2019/0012837 A1 Jan. 10, 2019

Related U.S. Application Data

(60) Provisional application No. 62/528,626, filed on Jul. 5, 2017.

(51) Int. Cl.
*G06T 7/73* (2017.01)
*G06T 19/00* (2011.01)
(Continued)

(52) U.S. Cl.
CPC ............ *G06T 19/006* (2013.01); *G02B 27/01* (2013.01); *G06F 3/03543* (2013.01);
(Continued)

(58) Field of Classification Search
CPC .... G06F 3/011; G06F 3/03543; G06F 3/0304; G06F 3/03547; G06F 3/167;
(Continued)

(56) References Cited

U.S. PATENT DOCUMENTS 9,546,002 B1 1/2017 Azcuenaga et al.
2003/0012410 A1* 1/2003 Navab ................. G06K 9/209
382/103

(Continued)

FOREIGN PATENT DOCUMENTS

DE 102004046144 A1 3/2006

*Primary Examiner* — Syed Haider
(74) *Attorney, Agent, or Firm* — Erise IP, P.A.

(57) ABSTRACT

An augmented visualization method for manufacturing includes providing an image of a part, identifying features of the part from the image based on software instructions, determining a computer-generated visual instruction based on features identified from the image, and displaying the computer-generated visual instruction on a visualization device. An augmented visualization system for manufacturing includes a camera for generating a real-time image of a part, a computer having software instructions that determine a computer-generated visual instruction based on features recognized from the real-time image, and a visualization device adapted for displaying the computer-generated visual instruction overlaid upon the real-time image. A manufacturing method performed using an augmented-visualization image includes displaying a heads-up view of a part via a visualization device, identifying features of the part based on the heads-up view, providing build instructions based on the features and the heads-up view, and augmenting the heads-up view with the build instructions.

24 Claims, 19 Drawing Sheets

(51) Int. Cl.
*G02B 27/01* (2006.01)
*G06F 3/0354* (2013.01)
*G09B 5/00* (2006.01)
*G06F 3/16* (2006.01)

(52) U.S. Cl.
CPC ............ *G06F 3/03547* (2013.01); *G06T 7/73* (2017.01); *G06T 7/74* (2017.01); *G09B 5/00* (2013.01); *G02B 27/017* (2013.01); *G06F 3/167* (2013.01); *G06T 2207/30164* (2013.01)

(58) Field of Classification Search
CPC .......... G06T 19/006; G06T 7/73; G06T 7/74; G06T 2207/30164; G09B 5/00; G02B 27/01; G02B 27/017
See application file for complete search history.

(56) References Cited

U.S. PATENT DOCUMENTS

| | | | |
|---|---|---|---|
| 2013/0162632 A1 | 6/2013 | Varga et al. | |
| 2015/0042678 A1* | 2/2015 | Alt | G06F 3/04815 345/633 |
| 2016/0364913 A1 | 12/2016 | Montaigne et al. | |
| 2016/0378861 A1* | 12/2016 | Eledath | G06K 9/00718 707/766 |
| 2017/0243400 A1* | 8/2017 | Skidmore | G06F 3/04842 |

* cited by examiner

AUGMENTED VISUALIZATION FOR MANUFACTURING

CROSS-REFERENCE TO RELATED APPLICATIONS

This application claims the benefit of U.S. Provisional Patent Application Ser. No. 62/528,626 entitled Augmented Visualization for Manufacturing and filed Jul. 5, 2017, the disclosure of which is herein incorporated by reference in its entirety.

BACKGROUND

1. Field

Embodiments of this disclosure relate generally to the field of aircraft manufacturing, and more specifically to augmented/virtual reality visualization systems and methods for production development and manufacturing of aircraft.

2. Description of the Related Art

Many different augmented/virtual reality systems are described in the prior art. For example, U.S. Patent Publication 2016/0364913 to Montaigne et al. discloses an augmented reality method and system for measuring and/or manufacturing that uses a measurement device (e.g., laser) for specifying positional relationships between target objects and a reference point. German Patent Publication DE102004046144 to Doil et al. discloses an augmented reality system for planning a production plant layout including collision analysis, detecting space geometries, and detecting a predetermined mark. U.S. Pat. No. 9,546,002 to Azcuenaga et al. discloses a virtual instrument verification tool that uses imaging technologies to verify correct configuration of an instrument panel.

SUMMARY

In an embodiment, an augmented visualization method for manufacturing is provided. The method includes providing an image of a part to a computer having non-transitory memory for storing software and a processor for executing software instructions; identifying, via the computer, features of the part from the image based on the software instructions; determining a computer-generated visual instruction based on features identified from the image; and, displaying the computer-generated visual instruction on a visualization device.

In another embodiment, an augmented visualization system for manufacturing is provided. The system includes a camera for generating a real-time image of a part; a computer having non-transitory memory for storing software and a processor for executing software instructions. The software instructions determine a computer-generated visual instruction based on features recognized from the real-time image. The system further includes a visualization device adapted for displaying the computer-generated visual instruction overlaid upon the real-time image of the part.

In yet another embodiment, a manufacturing method performed using an augmented-visualization image is provided. The method includes displaying a heads-up view of a part via a visualization device; identifying, via a computer, features of the part based on the heads-up view; providing, via the computer, build instructions based on the features of the part and the heads-up view of the part; and, augmenting the heads-up view of the part with the build instructions. The build instructions include a sequence of steps to perform on the part.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Manufacturing and production assemblies often require complex interaction between human operators, robots, tools, and heavy machinery. Providing an operator with real-time information is critical for ensuring quality and safety while reducing manufacturing time.

Embodiments of the present disclosure provide computer-generated imagery overlaid on a real-time camera image. The real-time image is provided from a camera to a visualization device and the computer-generated imagery augments the real-time image with additional information specific to a given task. The visualization device is configured to be viewed by the operator from a heads-up perspective. In other words, the operator does not need to look away from the parts and tools being manipulated in order to view the augmenting information. The visualization device is also configured for hands-free operation such that the operator may use his or her hands to perform tasks while using the visualization device to view the augmenting information.

Additional embodiments of the present disclosure provide computer-generated virtual visualization processes. The virtual visualization may depict parts and tools within a manufacturing environment including tooling, robots, heavy machinery, and building infrastructure. This enables the operator to prepare for specific tasks (e.g., rehearse sequences of steps) and visualize potential safety and ergonomic hazards prior to performing the tasks, and even prior to obtaining the parts and tools required to perform the tasks.

Exemplary aspects of aircraft manufacture that may be improved using the disclosed embodiments include parts modification (e.g., via visualization of drilling patterns), parts production, parts integration, time assessment, factory layout assessment, safety assessment, ergonomics assessment, and quality inspections. As disclosed herein, the terms "part" and "parts" may refer to various components and articles of manufacture including assemblies of parts that are integrated to form systems or subsystems.

Figure 1:
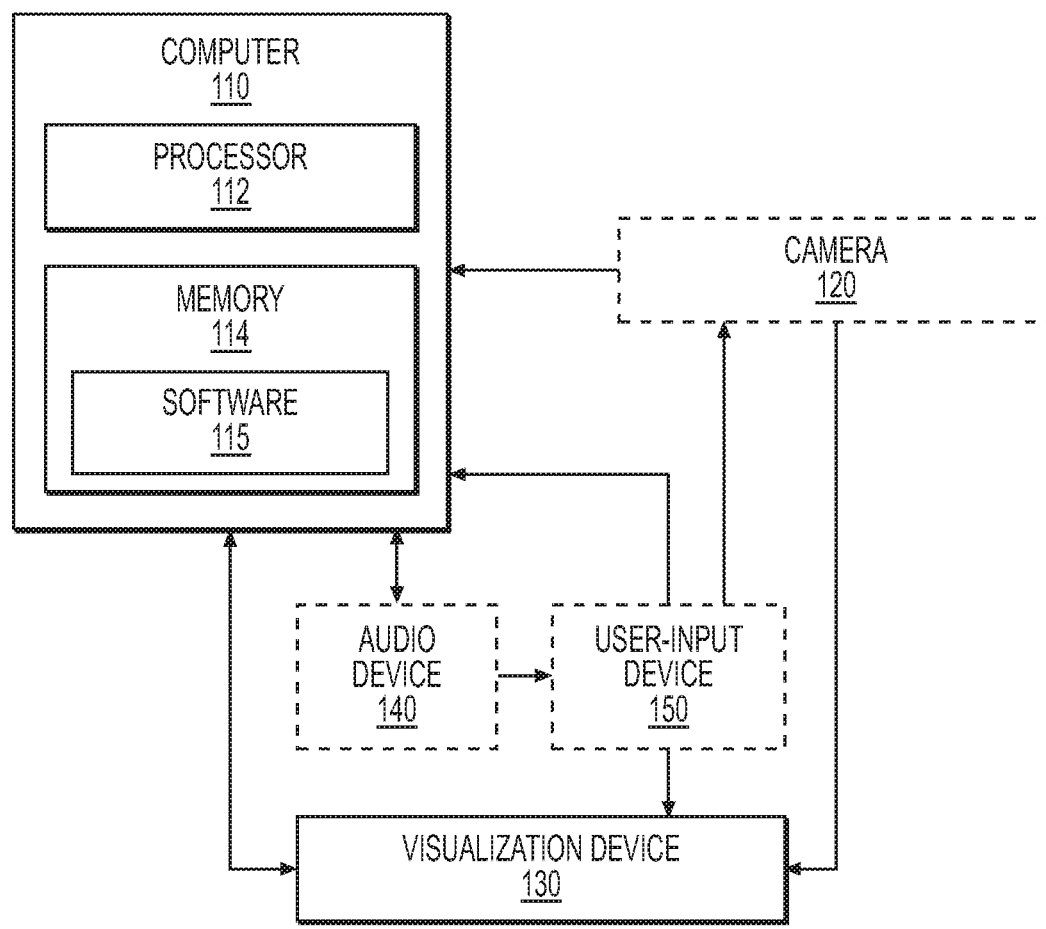
FIG. 1 is a block diagram of an augmented visualization system for manufacturing, in an embodiment.

FIG. 1 is a block diagram of an augmented visualization system for manufacturing 100. System 100 includes a computer 110 communicatively coupled to a visualization device 130. A camera 120 is optionally coupled to computer 110 and visualization device 130. Computer 110 is for example a general-purpose computer having a memory 114, including a non-transitory medium for storing software 115, and a processor 112 for executing instructions of software 115. Communication between computer 110 and camera 120 and between computer 110 and visualization device 130 may be by wired and/or wireless communication media.

Camera 120 is for example a digital video camera or a high-definition digital video camera. In certain embodiments, camera 120 is attached to, or incorporated within, visualization device 130 and configured for a user to wear. For example, visualization device 130 may include a wearable device including but not limited to a virtual reality (VR) headset, goggles or glasses, and camera 120 may include a forward-facing camera coupled to the headset/goggles/glasses. In some embodiments (e.g., a method of virtual visualization, FIG. 19), camera 120 is omitted and visual images are provided instead (e.g., from a computer model of a part).

An optional audio device 140 may be communicatively coupled with computer 110. Alternatively, audio device 140 is incorporated into one or more of computer 110 and visualization device 130. Audio device 140 includes a microphone and a speaker for receiving and projecting audible sounds, respectively. In certain embodiments, a user speaks commands to system 100, in which the microphone receives the spoken sounds and transmits signals representative of the sounds to computer 110 for processing. In other embodiments, audio device 140 provides audible instructions or cues to the user via the speaker.

An optional user-input device 150 may be communicatively coupled with computer 110, camera 120, and visualization device 130 for receiving user inputs. User-input device 150 may include any user-input means including but not limited to a touch screen, a joystick, a microphone configured to receive an audible command, a computer mouse, and a keyboard. In certain embodiments, a microphone of audio device 140 is configured as a portion of user-input device 150 for receiving audible user input.

Figure 2:
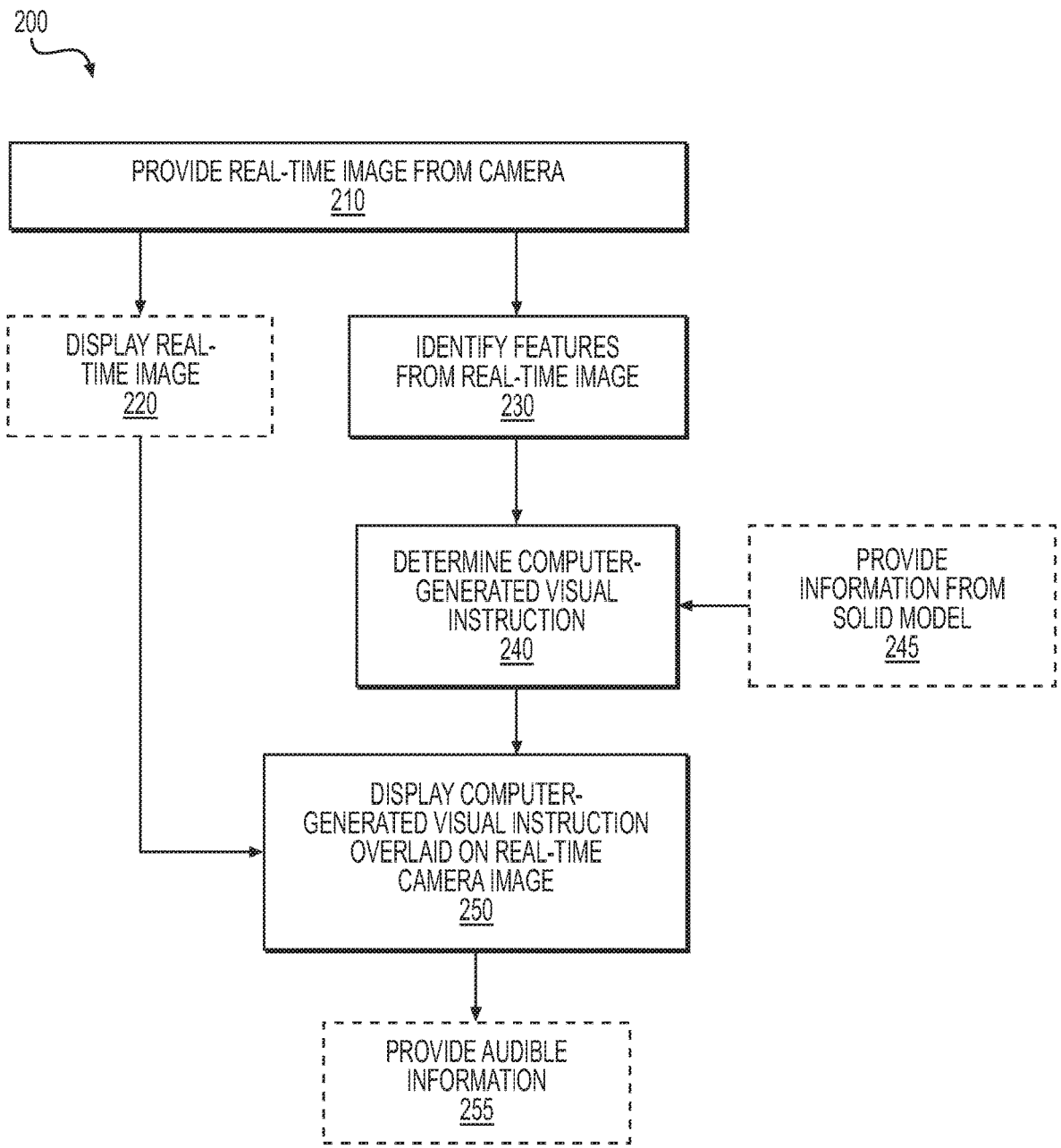
FIG. 2 is a block diagram of an augmented visualization method for manufacturing, in an embodiment.

FIG. 2 is a block diagram of an augmented visualization method for manufacturing 200. Method 200 may be performed with augmented visualization system 100, FIG. 1, for example.

In a step 210, a real-time image is provided from one or more cameras. In an example of step 210, the real-time image is provided from camera 120, FIG. 1. Camera 120 may be any camera capable of providing a live video feed. In certain embodiments where visualization device 130 is wearable and camera 120 is coupled thereto, the real-time image may provide a live video of a heads-up view (e.g., a forward-facing view from the user's perspective). In other embodiments, a plurality of cameras are employed to provide a corresponding plurality of views for display by visualization device 130. For example, a camera may be positioned above a workstation to provide an overhead view, a remote camera may be positioned inside a part or a system of integrated parts (e.g., temporarily) to provide an internal view, a moveable camera may be adapted for moving to alter a vantage point (e.g., on a gimbal, swivel plate, or rail, or on a tripod, stand, or post having wheels). The camera movement may be controlled by an operator or under preprogrammed control via computer 110, FIG. 1, for example. Visualization device 130 may include VR goggles/glasses, computer monitors, televisions, touch screens, and mobile devices (e.g., smart phones and tablets). A plurality of views may be displayed on visualization device 130; alternatively, a plurality of visualization devices may be used to provide a plurality of views. Selection and enhancement (e.g., scrolling, panning, zooming) of views may be provided via user-input device 150, for example.

In some embodiments, the real-time image of the part is a hybrid image formed from a real-time camera image overlaid with virtual features from a virtual image based on a computer model of the part.

In an optional step 220, a real-time image is displayed. In an example of step 220, the real-time image provides a heads-up view that is displayed by visualization device 130. In certain embodiments, a plurality of views are provided by one or more visualization devices 130.

In a step 230, features from one or more images are recognized. In an example of step 230, software 115 includes image processing instructions for analyzing images to recognize certain objects or features of objects. The images may be captured from the real-time image provided in step 210, for example. The image processing instructions may include object and shape recognition, identification, and detection. In certain embodiments, software programs may be trained using images of parts and tools prior to manufacturing. For example, artificial intelligence techniques may be applied to images for object recognition, identification, and detection.

In a step 240, a computer-generated instruction is determined. In an example of step 240, computer 110 generates computer-generated imagery for conveying information to a user (e.g., via visualization device 130 and/or audio device 140) for performing a manufacturing task. Several embodiments of step 240 are described below in connection with FIGS. 3-18.

In another example of step 240, computer 110 generates a computer-generated virtual-visualization process. The virtual-visualization process enables the operator to prepare for specific tasks (e.g., rehearse sequences of steps) and visualize potential safety and ergonomic hazards prior to performing the tasks, including in advance of obtaining parts and tools required to perform the tasks.

In an optional step 245, information from a solid model is provided. In an example of step 245, a solid model (e.g., a computer-aided design (CAD) model) is stored in memory 114 of computer 110, and information from the solid model or CAD model is used by software 115 for determining computer-generated instruction. Since a solid model may include information not readily visible in camera images, information extracted from the solid model may be used to supplement information recognized from the camera images.

In a step 250, computer-generated instruction is overlaid on the real-time camera image and displayed. In an example of step 250, imagery generated by computer 110 is overlaid on the real-time image from camera 120 and displayed via visualization device 130, FIG. 1. In certain embodiments, the computer-generated instruction includes virtual visualization processes, visual indicators, bright colors, flashing indicators, moving indicators, text labels, as well as other attention-grabbing means. Virtual visualization processes may depict parts and tools within a manufacturing environment including tooling, robots, heavy machinery, and building infrastructure. Several embodiments of step 250 are described below in connection with FIGS. 3-18.

In an optional step 255, audible information is provided. In an example of step 255, audible information is provided to the user via audio device 140. Audible information may include audible cues, instructions, reminders, and/or warnings. The audible information may be provided to the user in the form of speech, bells, dings, whistles and other attention-grabbing noises without departing from the scope hereof.

Method 200 may be performed in an iterative or repetitive manner. For example, while performing a sequence of steps, the user may provide feedback to computer 110, camera 120, and/or visualization device 130 via audio device 140 and/or user-input device 150, FIG. 1, such that the method is advanced to a subsequent step or returned to a prior step of the sequence based on the user feedback. An exemplary sequence of steps is described below in connection with FIG. 7.

Figure 3:
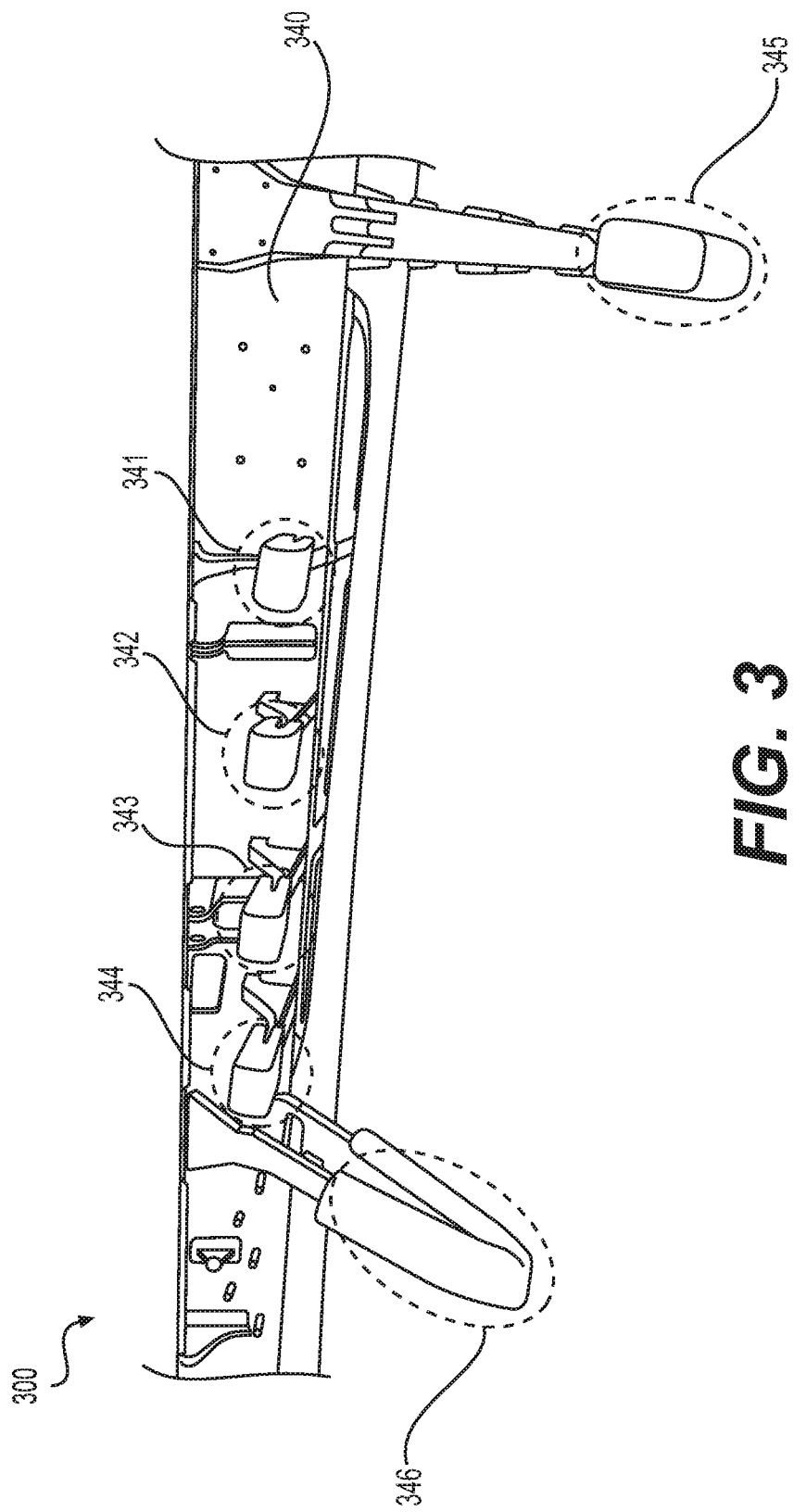
FIG. 3 shows an exemplary safety augmented visualization view provided by the system of FIG. 1.

FIG. 3 shows an exemplary safety augmented visualization view 300. Safety view 300 may be provided by method 200 using visualization device 130 including a real-time view from camera 120 and virtual imagery overlaying the real-time view provided by computer 110, FIG. 1, for example. The augmented information in safety view 300 includes visual warning indicators 341, 342, 343, 344, 345, and 346 that highlight potential hazards to the operator. For example, visual warning indicators 341-344 highlight protrusions extending from part 340, and visual warning indicators 345, 346 highlight the ends of additional protrusions extending from part 340. These protrusions may present a head impact hazard, for example, and may be wrapped in a protective material. Other potential hazards that may be highlighted via augmented visualization system 100 include, but are not limited to, sharp edges, pinch points, trip hazards, and fall hazards. The display of visual warning indicators 341-346 may include markings that are easy to visualize. For example, visual warning indicators 341-346 may include bright colors, flashing indicators, moving indicators, text labels, as well as other attention-grabbing means. Optionally, audible indicators may be provided by audio device 140 to supplement the visual indicators. The audible indicators may include speech, bells, dings, whistles and other attention-grabbing noises.

In an embodiment, system 100 provides a safety analysis in a virtual state prior to operator interaction with physical tools and parts. For example, computer 110 may analyze images from camera 120 and determine potential safety issues for the operator to acknowledge prior to entering the workspace.

Figure 4:
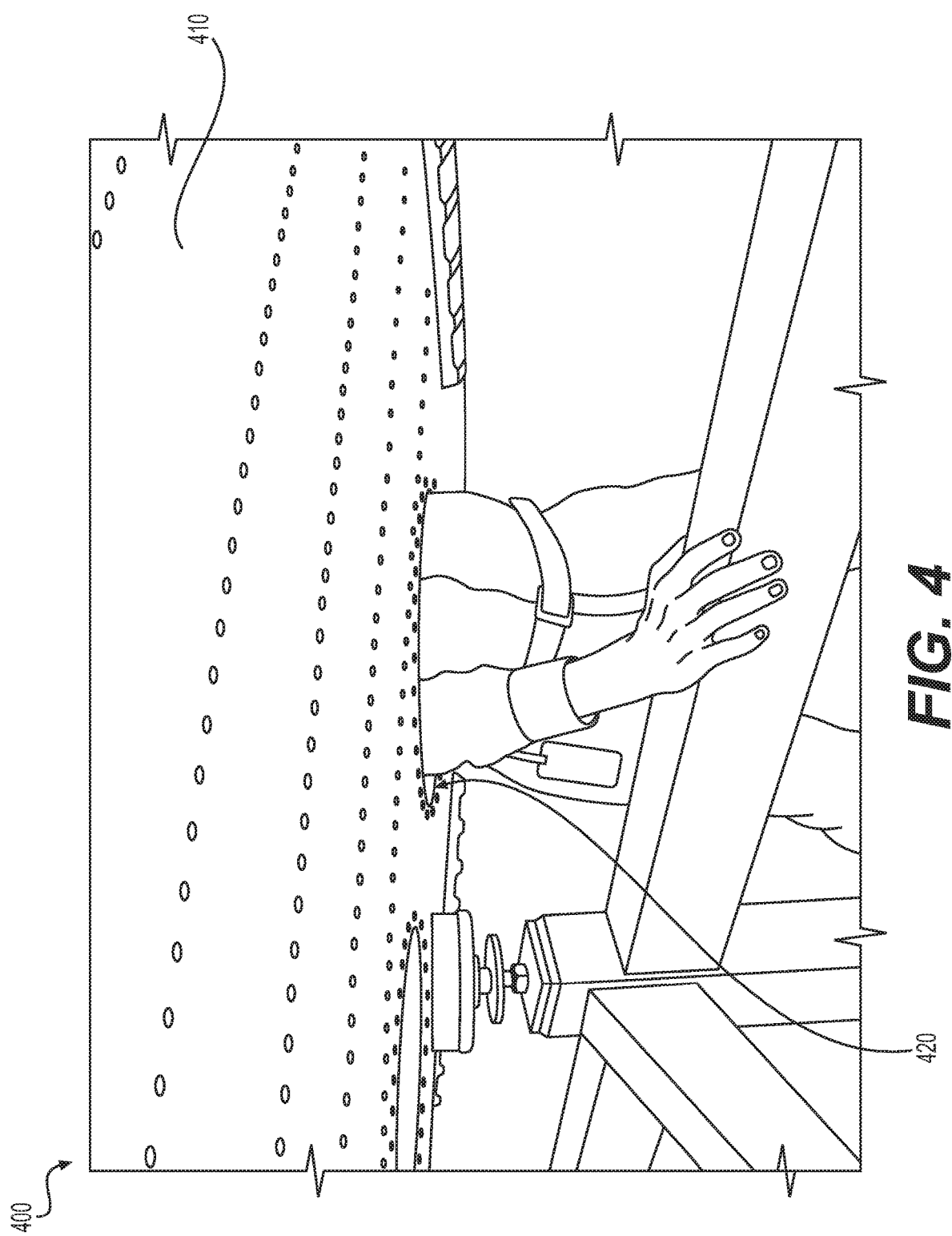
FIG. 4 illustrates a user accessing an inner portion of a wing through a wing access panel.

FIG. 4 illustrates a user accessing an inner portion of an aircraft wing 410 through a wing access panel 420. However, many sections of the inner portion of wing 410 may not be within reach of the user. By providing a virtual visualization, such as a computer-generated augmented-visualization imagery, provided by method 200 and system 100 for example, a user may virtually perform manufacturing-related tasks. For the example depicted in FIG. 4, a virtual visualization enables the user to visualize reach limitations in the inner portion of wing 410 without the user having to physically enter the wing. For example, a user may virtually test a tool (e.g., based on a solid model of the tool) to determine if the tool will provide sufficient reach without requiring the operator to physically possess the tool or to be inside wing access panel 420.

Figure 5:
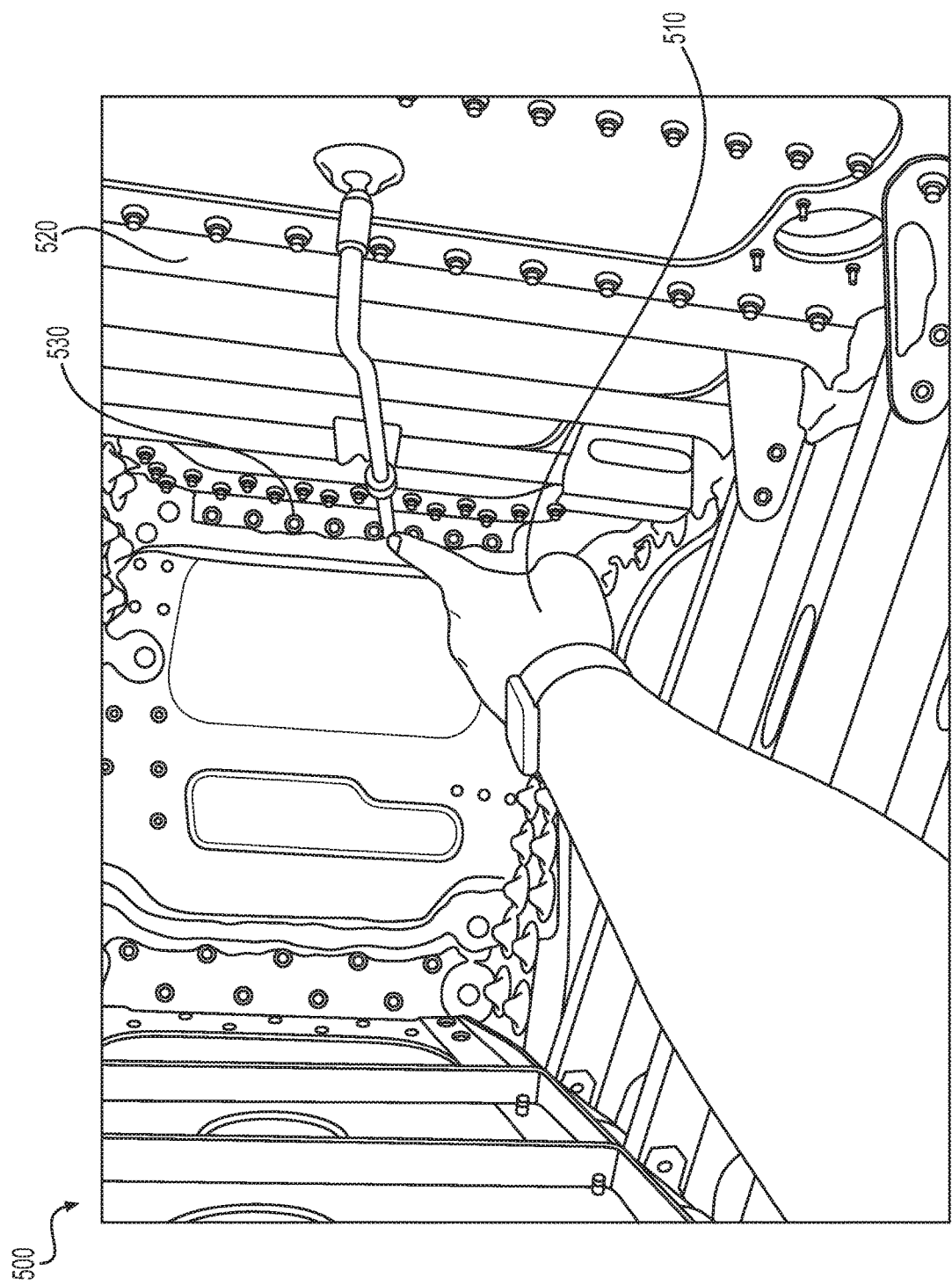
FIG. 5 shows a virtual ergonomic analysis, in an embodiment.

FIG. 5 shows an exemplary virtual ergonomic-analysis imagery 500. Specifically, a user's outstretched arm 510 is depicted reaching into an augmented visualization of a structure 520 to determine how to ergonomically access a part. For example, the distance, angle, orientation of a bolt 530 may be evaluated and a virtual tool (e.g., a wrench) may be virtually tested to evaluate space within structure 520 for manipulating the tool. In certain embodiments, ergonomic studies may be completed using an engineering or tool design (e.g., from a solid model) during the design process or prior to release or fabrication of a part. In some embodiments, the ergonomic-analysis imagery may include dynamic imagery of virtual features. For example, a virtual image of a tool may be used to dynamically illustrate its path during expected use overlaid on a real-time or virtual image of a part or assembly.

Figure 6:
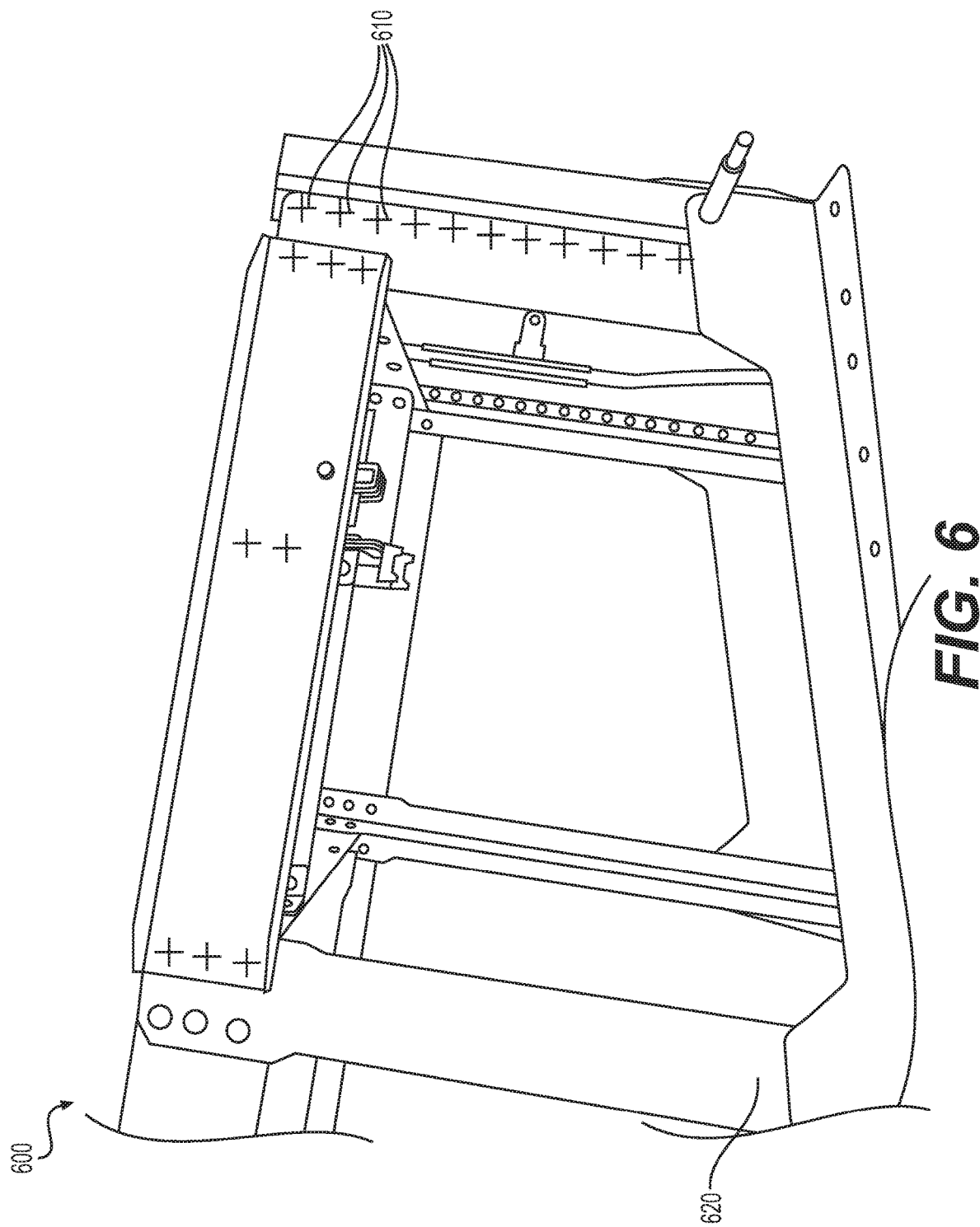
FIG. 6 shows an augmented visualization view, in an embodiment.

FIG. 6 shows an exemplary augmented visualization view 600 with augmented-visualization indicators 610 overlaid on a real-time image of a part 620. Indicators 610 may indicate fastener locations, for example. View 600 may further include such additional information as hole sizes, fastener types, and tool identifiers overlaid on the real-time image. Augmented visualization view 600 may be used in place of, or to assist with, manual layout of fasteners (e.g., using a scale and a marker).

Figure 7:
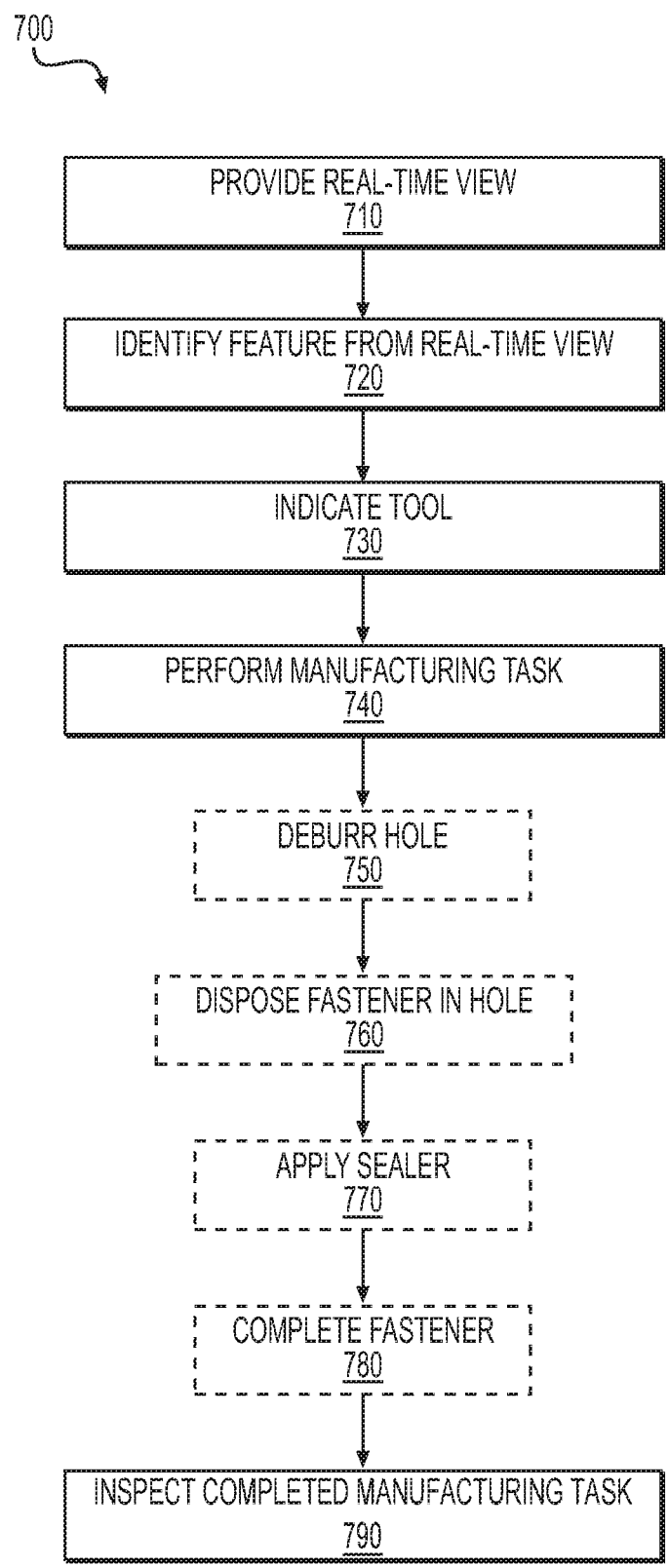
FIG. 7 is a block diagram showing a fastener attachment method, in an embodiment.

FIG. 7 is a block diagram showing an exemplary fastener attachment method 700 performed using an augmented visualization view, such as view 600, FIG. 6, for example. For manufacturing/production tasks, a build sequence may be displayed for a user to visualize while performing the tasks. For example, while looking at a real-time view of a part, build instructions may be displayed overlaying the real-time view. Instructions that include a sequence of steps may be presented as a collective sequence, or each step may be individually presented in a step-by-step manner corresponding to completion of each step. The build instructions may be supplemented with additional information (e.g., engineering data, tool numbers, parts numbers) displayed to aid the operator while building an assembly or installing a part. Method 700 may be performed in an iterative or repetitive manner. For example, augmenting of the real-time image may be repeated for a portion of the build instructions (e.g., for installing multiple fasteners in a similar manner). In certain embodiments, while performing each of steps 710-790, the user may provide feedback to computer 110, camera 120, and/or visualization device 130 via audio device 140 and/or user-input device 150, FIG. 1, such that the method is advanced to a subsequent step of the sequence based on the user feedback.

In a step 710, a real-time view is provided. In an example of step 710, camera 120, FIG. 1 is directed at part 620, FIG. 6 to acquire a real-time view, which is displayed via visualization device 130. In certain embodiments, the visualization device is a VR headset (e.g., goggles or glasses) with a coupled or incorporated camera such that a user facing a part automatically directs the camera at the part.

In a step 720, a feature is identified from the real-time view. In an example of step 720, computer 110, FIG. 1 determines augmented-visualization indicators 610, FIG. 6, which are used to identify fastener hole locations. Of course, augmented-visualization indicators may be used to identify other manufacturing-related locations in addition to fastener holes without departing from the scope hereof.

In a step 730, a tool is indicated. In an example of step 730, information is presented via visualization device 130 to indicate a tool (e.g., a drill) to be used for performing a task (e.g., drilling fastener holes). Step 730 may be automatically executed by computer 110 once an augmented-visualization indicator has been used for part identification (e.g., as in step 720). Alternatively, step 730 may be executed based upon feedback from the user.

In a step 740, a manufacturing task is performed. In an example of step 740, a drill is used to form a fastener hole. The drill may be manually operated by the user or automatically operated via a robot (e.g., under control of computer 110).

Optional steps 750, 760, 770, and 780 provide exemplary additional manufacturing tasks to be performed. In the example provide in FIG. 7, steps 750-780 include additional tasks related to installing a fastener, but other manufacturing tasks could be performed without departing from the scope hereof.

In an optional step 750, a fastener hole is deburred. In an example of step 750, the user or robot may deburr the hole drilled in step 740. The appropriate tool (e.g., vixen file, deburr hook, burr quick, drill bit) to be used may be indicated with an augmented visualization via visualization device 130, FIG. 1.

In a step 760, a fastener is disposed. In an example of step 760, the user or a robot may dispose a fastener into the hole deburred in step 750. The fastener may be specific type (e.g., rivet, screw, bolt) and have a specific material, finish, diameter, and length. The fastener is placed in proper orientation (e.g., head near side, head far side) through a hole to secure two or more parts together.

In a step 770, a sealer is applied. In an example of step 770, the user or a robot may apply a sealer to the parts and fastener located in step 760. If fay sealing is required, step 770 is completed prior to step 760. Prior to sealer application, the surface is prepared per application specification. The sealer material is applied with an appropriate tool (e.g., sealer gun, knife, spatula).

In a step 780, a fastener installation is completed. In an example of step 780, the user or robot may complete the installation of the fastener disposed in step 760. Fastener installations are completed using the appropriate tool (e.g., pneumatic gun, riveting hammer, buck bar, squeeze, rivet gun, pull gun, rivet sets, wrench) for the type of fastener (e.g., rivet, screw, bolt).

In a step 790, a completed manufacturing task is inspected. In an example of step 790, the real-time view from camera 120 is analyzed via computer 110 to determine if the fastener was installed correctly. Inspection verifies the proper installation of the fastener (e.g., location, size, length, torque, shear, head height, damage).

Method 700 is intended to illustrate one example of a manufacturing task that may be aided using system 100 by providing step-by-step instructions while installing fasteners. Of course, method 700 may be applied to performing other manufacturing tasks without departing from the scope hereof.

Figure 8:
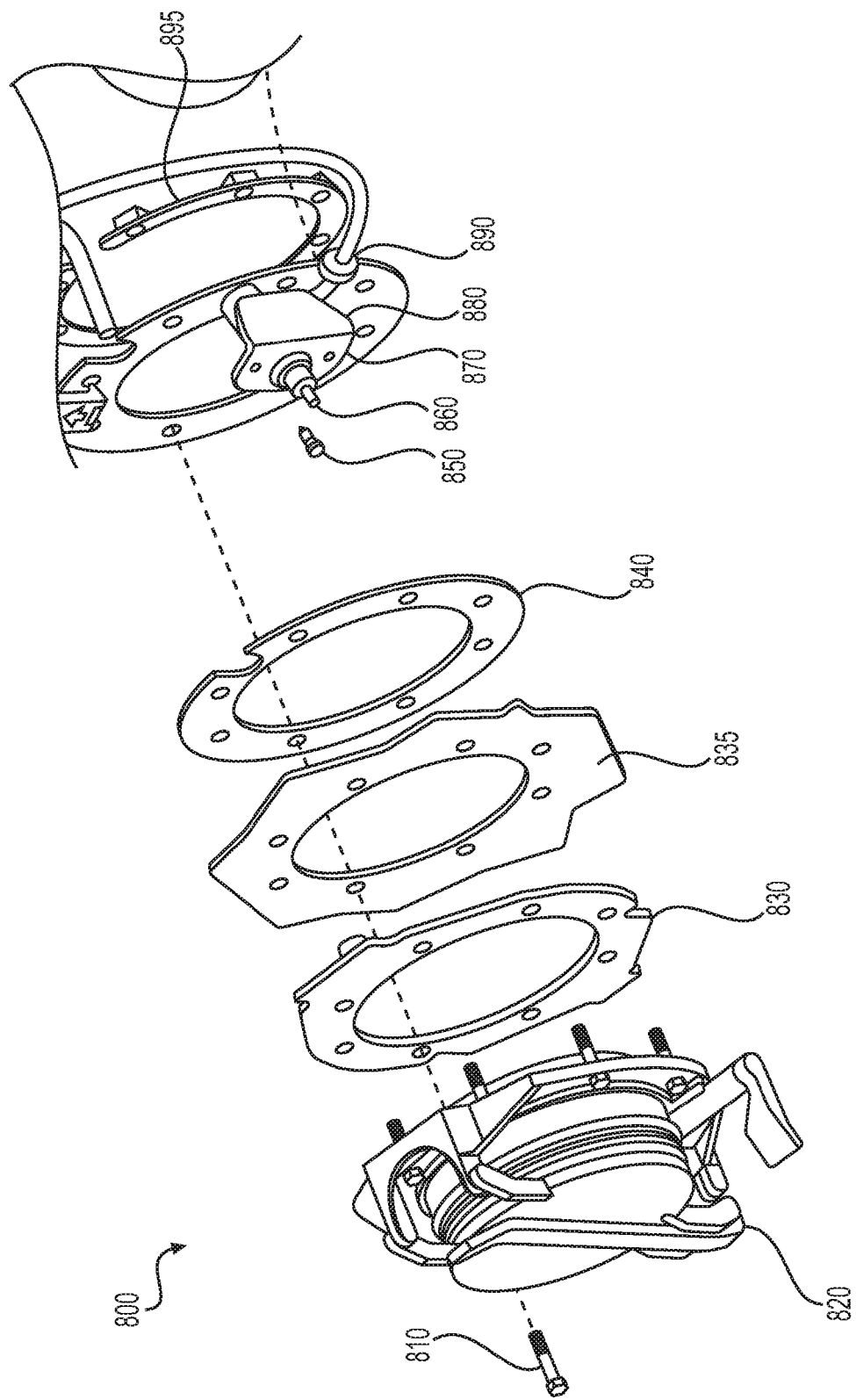
FIG. 8 shows a part stack-up for display via a visualization device of FIG. 1.
Figure 9:
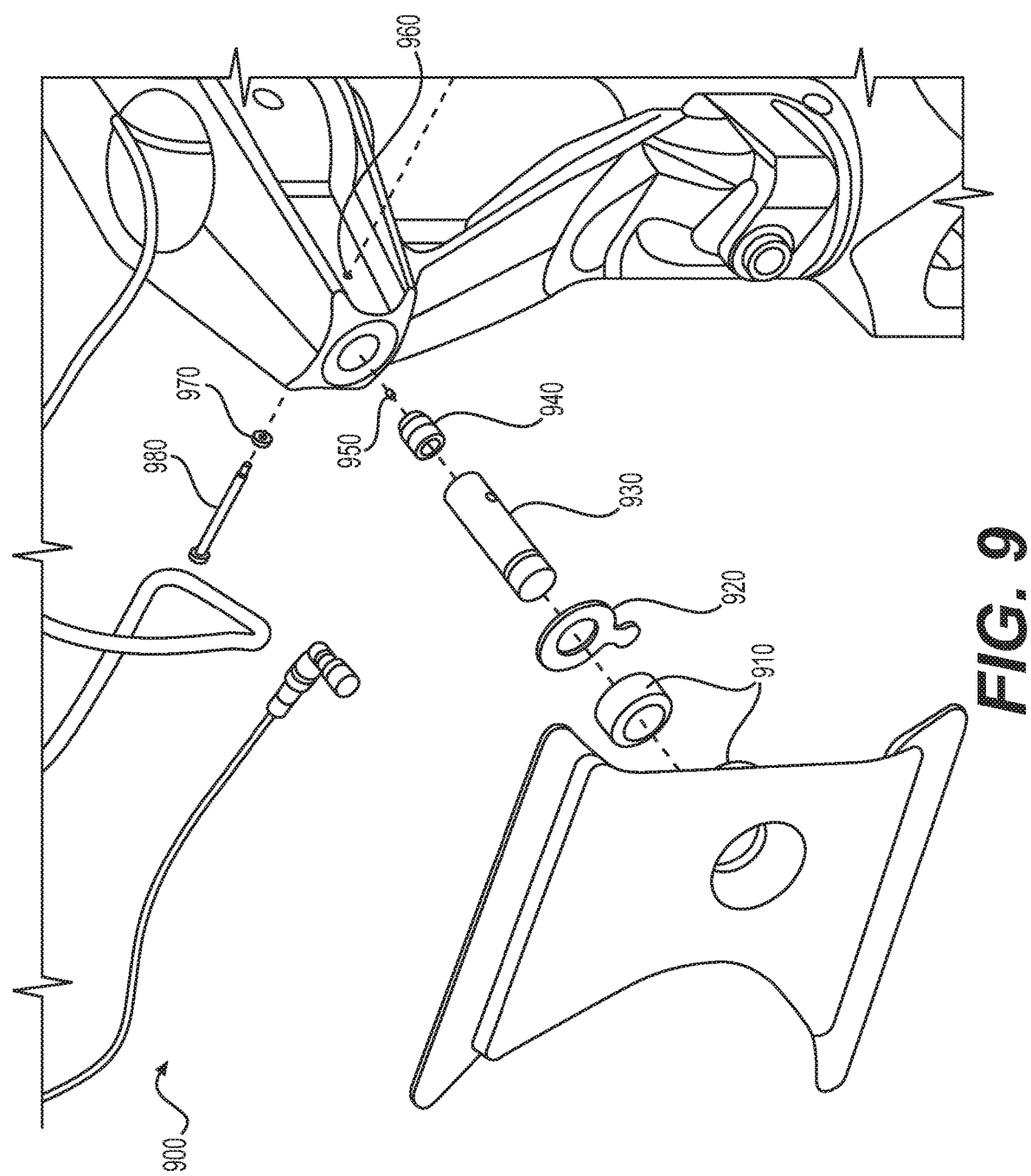
FIG. 9 shows another part stack-up for display via the visualization device of FIG. 1.

FIGS. 8 and 9 illustrate exemplary part stack-ups for display via visualization device 130. Specifically, FIG. 8 shows a part stack-up 800 that includes an "exploded view" of a series of parts 810-895 configured for integrated assembly. For example, a bolt 810 is aligned with a path, highlighted in FIG. 8, through bolt holes of parts 820, 830, 835, 840, and 890. Similarly, FIG. 9 shows a part stack-up 900 that includes an exploded view of a series of parts 910-980 with paths highlighted to illustrate part alignment. Part stack-ups 800 and 900 may be presented to the user via visualization device 130 while the parts are being assembled either by hand or using a robot. As a build sequence is being performed, individual parts may be highlighted corresponding to a current step of the sequence to aid the assembly process. The user may advance the sequence, or repeat a portion of the sequence, by providing feedback through audio device 140 and/or user-input device 150, FIG. 1, for example. In certain embodiments, the part stack-ups may include dynamic imagery of virtual features. For example, a virtual image of a part stack-up may be used to dynamically illustrate a path for installation of a bolt or other component.

Figure 10:
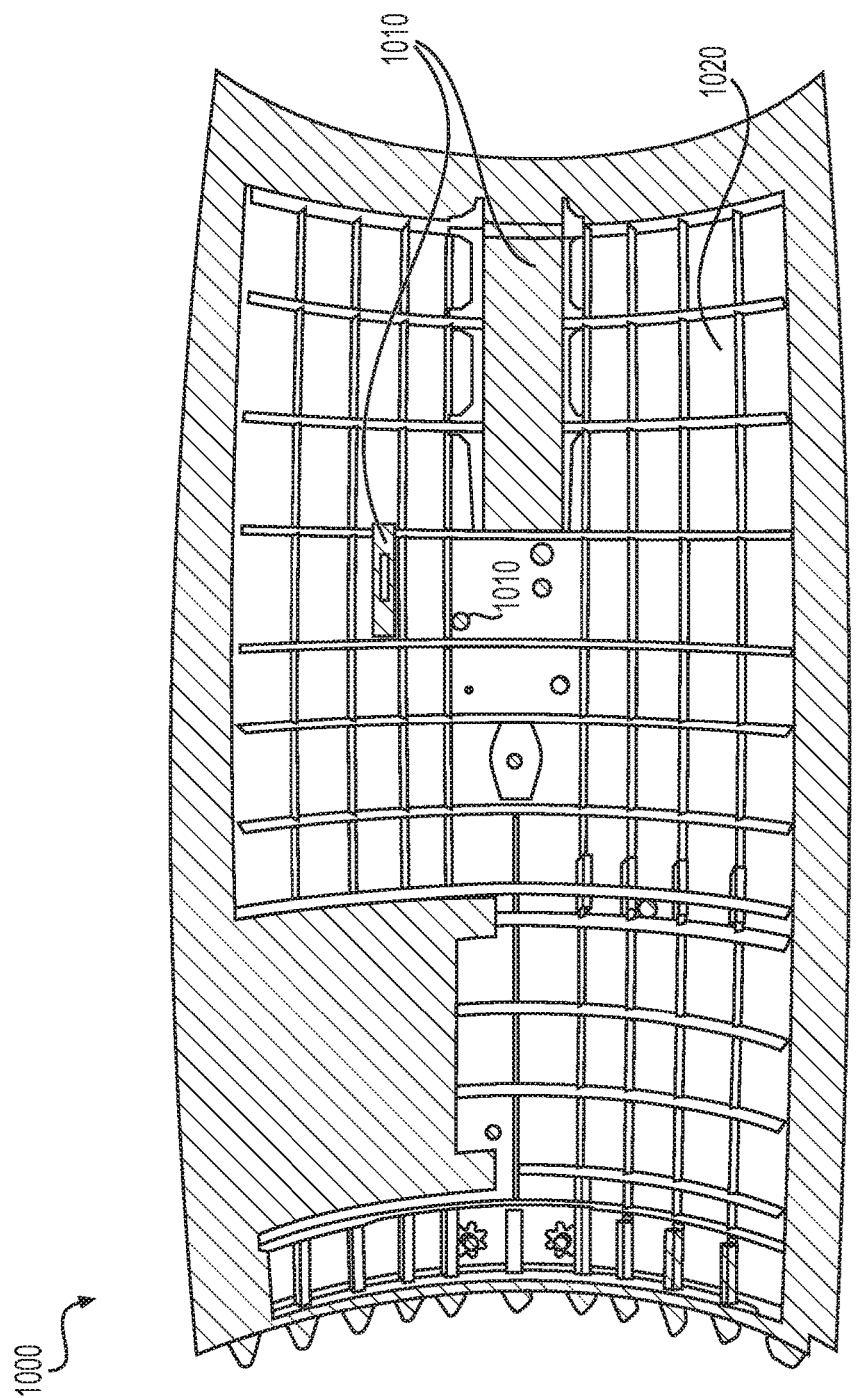
FIG. 10 illustrates an augmented-visualization view for masking, in an embodiment.
Figure 11:
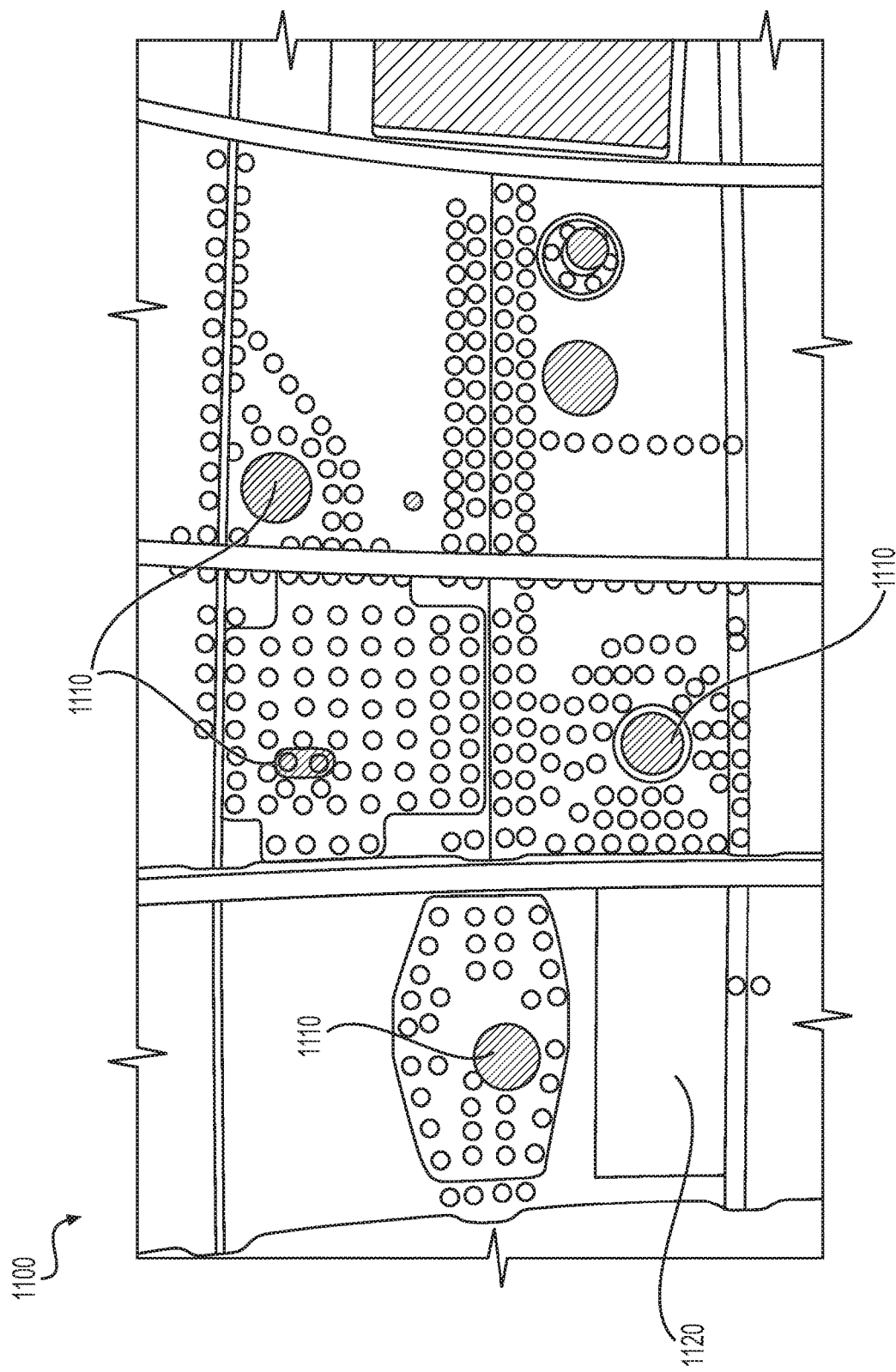
FIG. 11 illustrates another embodiment of an augmented-visualization view for masking.

FIGS. 10 and 11 illustrate exemplary masking for display via visualization device 130. Masking is routinely used for covering features while applying paint or corrosion protection. Parts that require masking may be virtually masked with augmented-visualization indicators to assist the operator while the masking process is performed. Detailed information may be provided to operator via visualization device 130 to indicate where to mask or bag (e.g., by highlighting areas and edges, and providing an ability to enhance contrast of a real-time view). FIG. 10 illustrates an augmented-visualization view for masking 1000 that includes augmented-visualization indicators 1010 overlaid on a real-time view of a fuselage section 1020. Similarly, FIG. 11 illustrates an augmented-visualization view for masking 1100 that includes augmented-visualization indicators 1110 overlaid on a real-time view of a panel section 1120. Note that not all indicators are enumerated in FIGS. 10 and 11 for clarity of illustration. In certain embodiments, the augmented-visualization may include dynamic imagery of virtual features overlaid on the real-time view. For example, a virtual image of masking may be used to dynamically illustrate a path for installation of the masking on a part.

Figure 12:
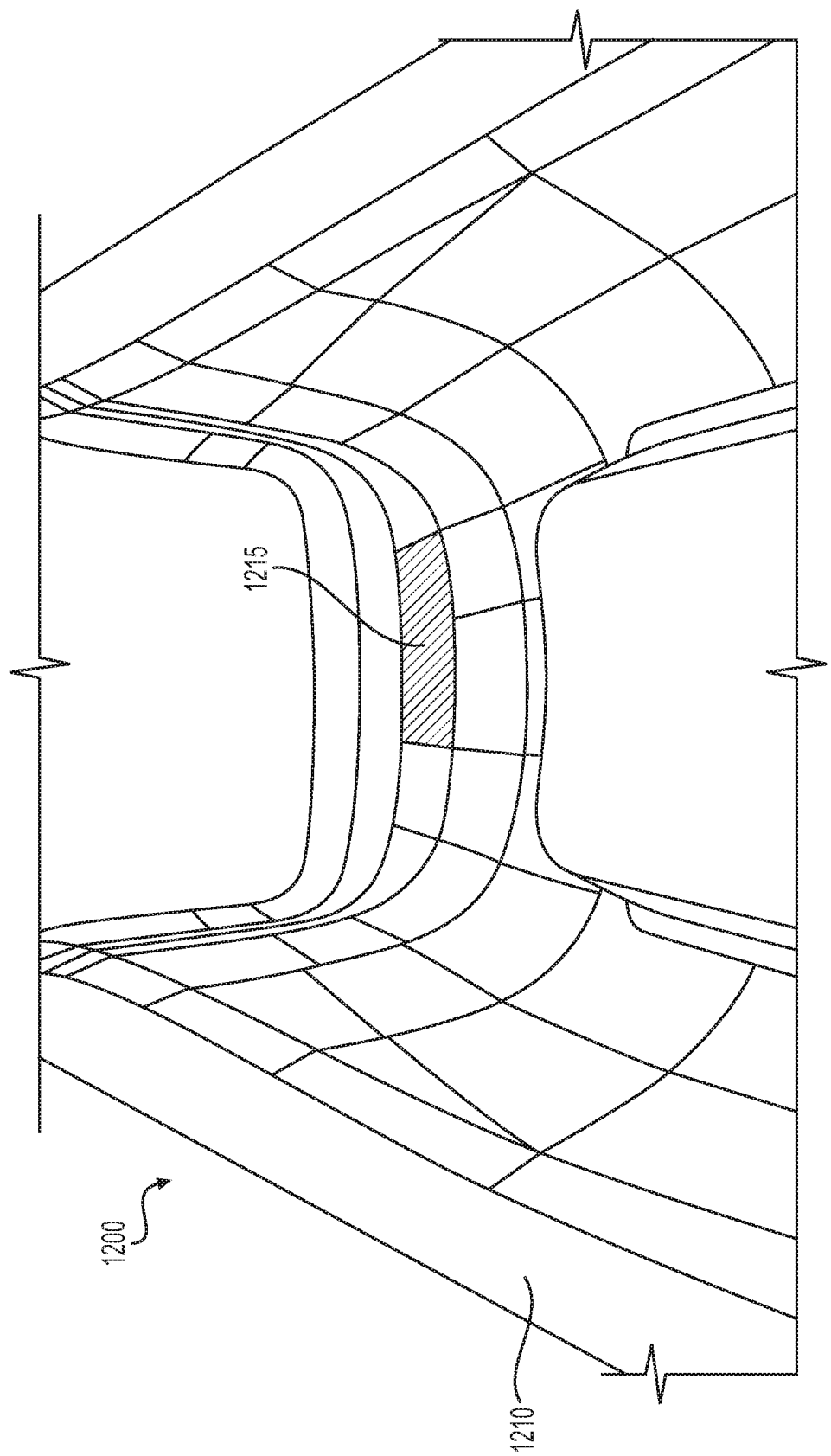
FIG. 12 shows a ply layup on a part for display via the visualization device of FIG. 1.
Figure 13:
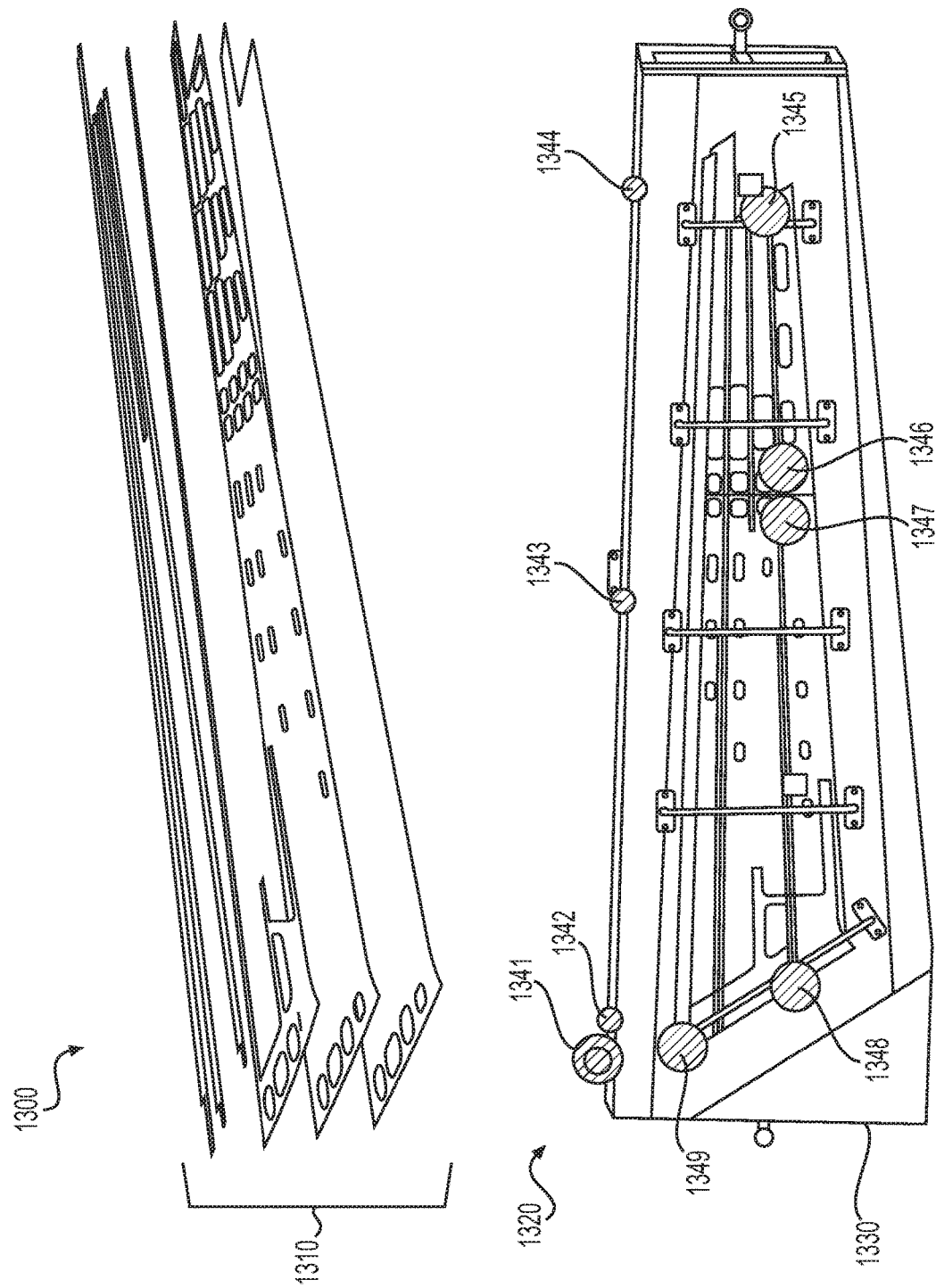
FIG. 13 shows a stack-up of plies and a map indicating where the plies line up for display via the visualization device of FIG. 1.

FIGS. 12 and 13 illustrate exemplary bonding assemblies for display via visualization device 130. Assembling composite materials (e.g., laying up plies) and bonding metals may be aided by augmented-visualization indicators overlaid on a real-time view. The augmented-visualization indicators may display a layout pattern and/or a layout order for composite assembling or metal bonding. For example, the augmented real-time view enables an operator to see which ply or layer is next to install. FIG. 12 shows an exemplary ply layup 1200 on a part 1210 with an augmented-visualization indicator 1215 highlighted. Indicator 1215 may be adapted to highlight a particular portion of the ply layup for assisting the user with an assembly process.

FIG. 13 is an exploded view showing a stack-up of plies 1310 and a map 1320 indicating where the plies line up with a part 1330. Map 1320 may include a plurality of augmented-visualization indicators 1341-1349, which may include labels having text or numerals to indicate which features of plies 1310 align with features of part 1330, for example. In certain embodiments, indicators 1341-1349 correspond with a sequence of steps such that the indicators are highlighted sequentially corresponding with a particular step. Additionally, a legend may be displayed for providing information about indicators 1341-1349. In certain embodiments, the augmented-visualization may include dynamic imagery of virtual features overlaid on the real-time view. For example, a virtual image of one or more plies may be used to dynamically illustrate a path for laying up the one or more plies.

Figure 14:
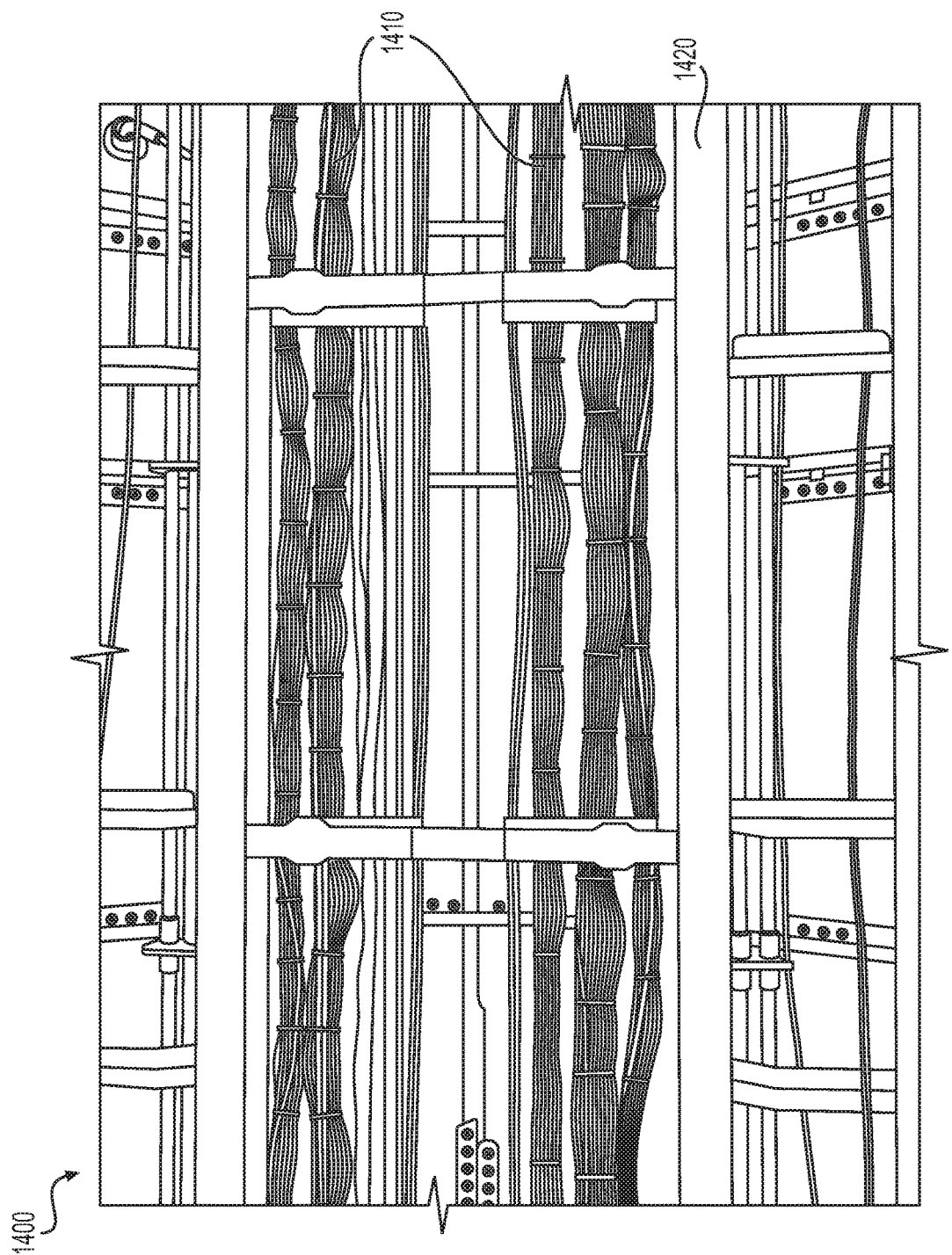
FIG. 14 shows virtual wiring bundles overlaid on a real-time view of a panel, in an embodiment.
Figure 15:
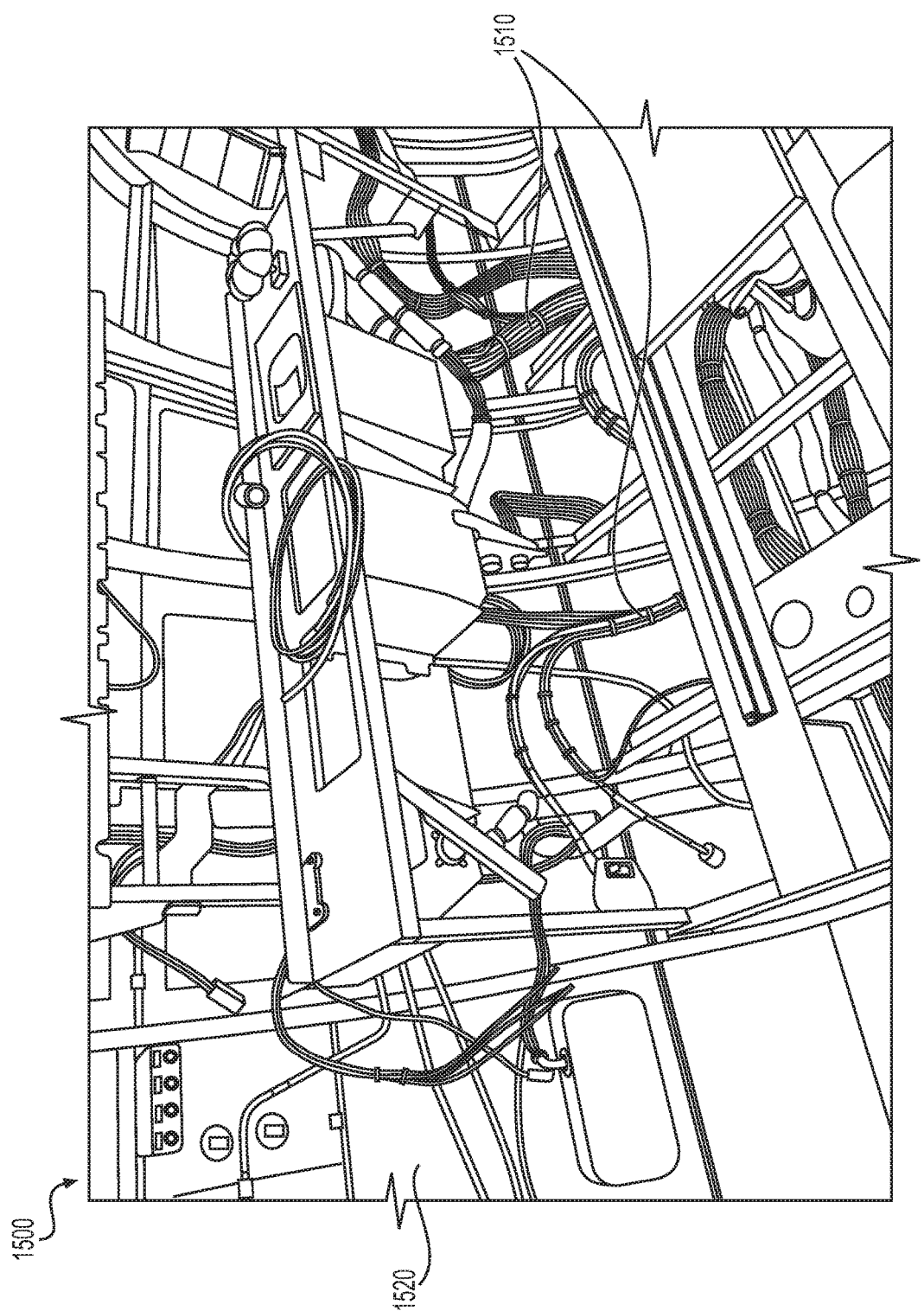
FIG. 15 shows virtual wiring bundles overlaid on a real-time view of a fuselage assembly, in an embodiment.

FIGS. 14 and 15 illustrate exemplary augmented-visualization views 1400 and 1500, respectively, which show virtual electrical wiring installations overlaid on a real-time view for display via visualization device 130. FIG. 14 shows virtual wiring bundles 1410 overlaid on a real-time view of a panel 1420. FIG. 15 shows virtual wiring bundles 1510 overlaid on a real-time view of a fuselage assembly 1520. As each electrical wiring bundle is installed, a path or routing may be highlighted with augmented-visualization indicators to assist the operator, such as details including but not limited to anchors, ground connections, and wire ties. In certain embodiments, the augmented-visualization may include dynamic imagery of virtual features overlaid on the real-time view. For example, a virtual image of an electrical wiring bundle may be used to dynamically illustrate a path for installation (in other words, to virtually demonstrate to the user how to install or route the wiring bundle).

Figure 16:
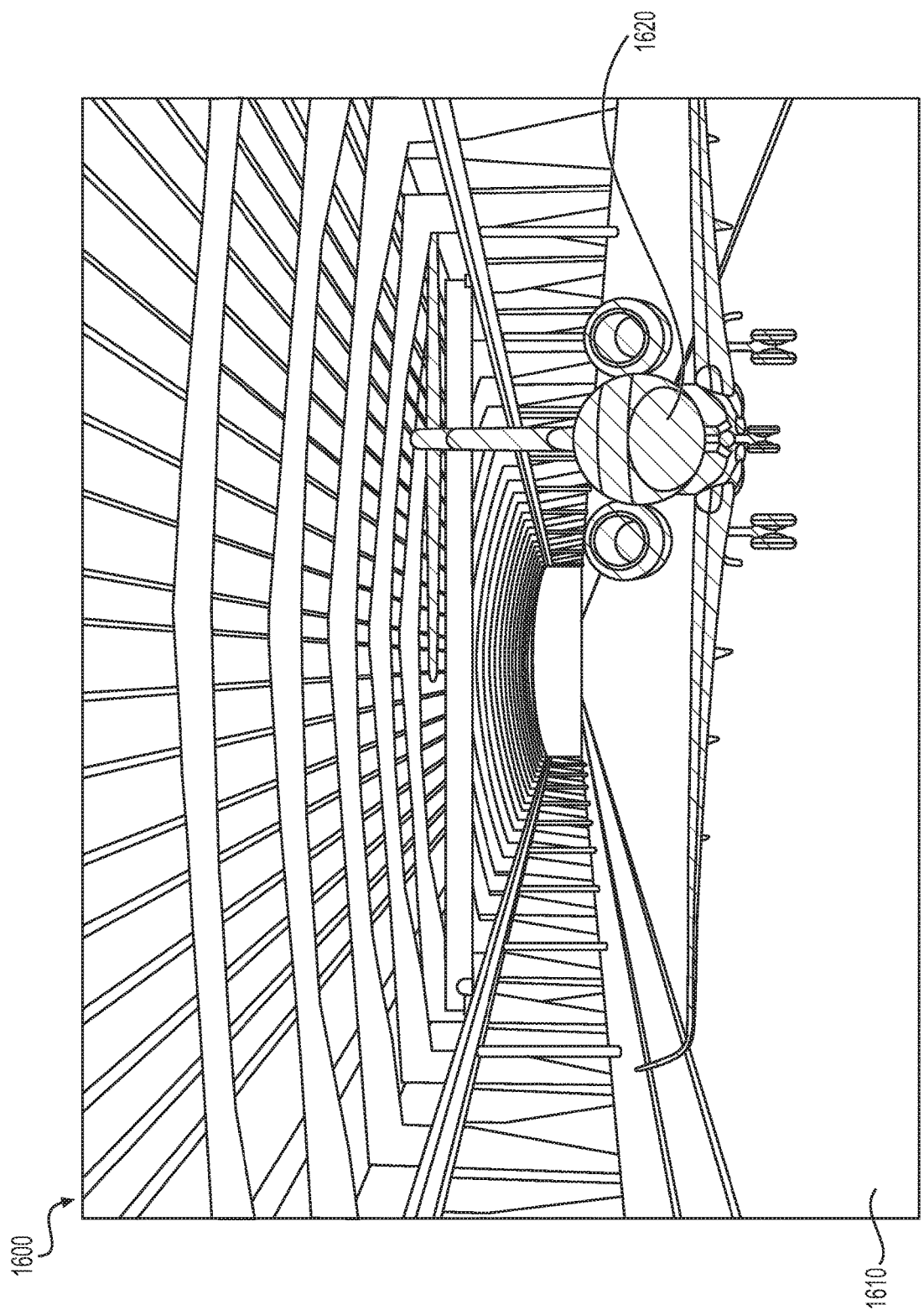
FIG. 16 shows a drawing of an aircraft overlaid on a camera image of a factory floor, in an embodiment.
Figure 17:
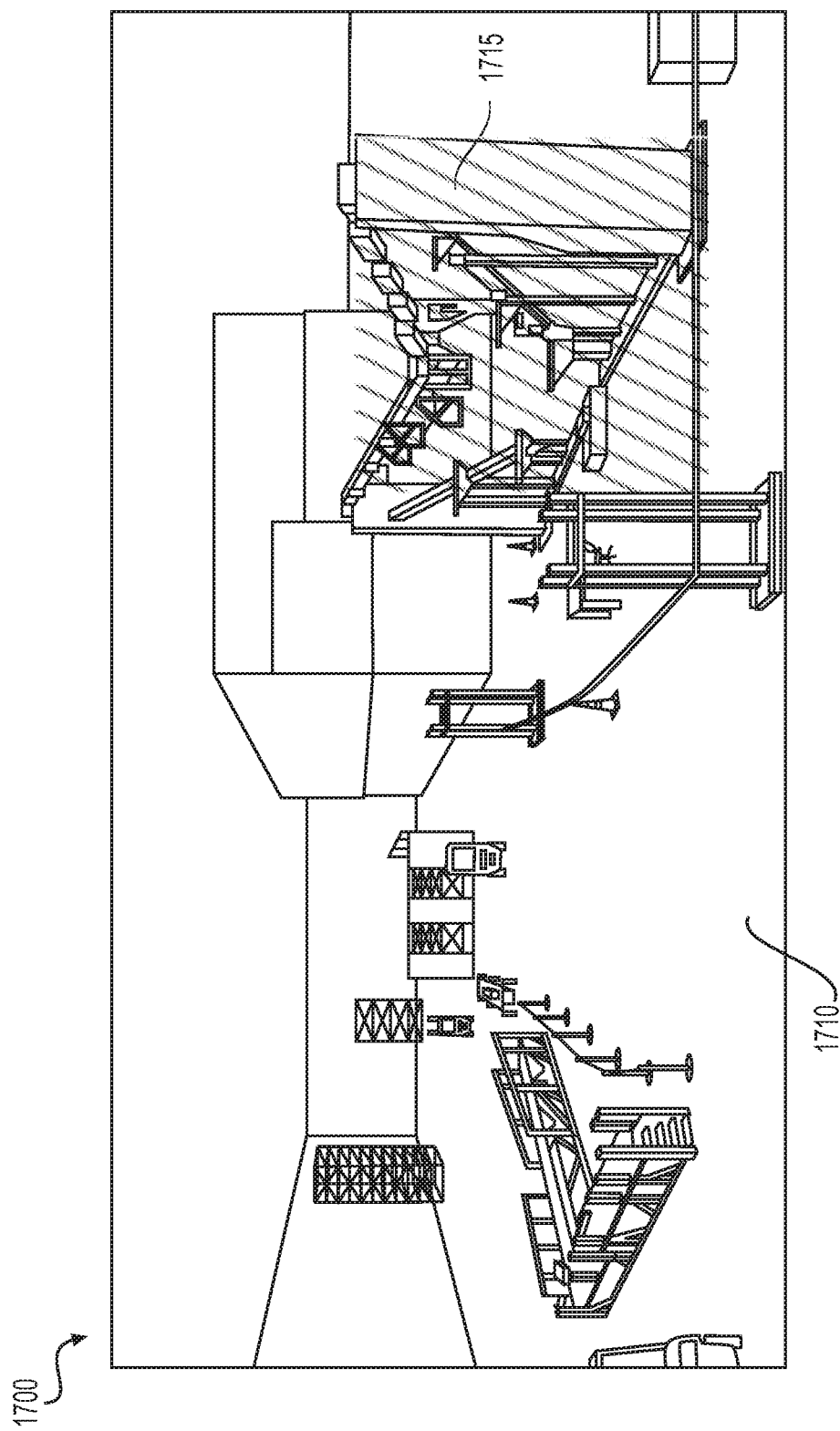
FIG. 17 shows a camera image of a factory floor with various tooling and equipment for manufacturing assemblies, in an embodiment.

FIGS. 16 and 17 illustrate exemplary augmented-visualization views 1600 and 1700, respectively. The augmented-visualization views 1600 and 1700 may be used as part of an augmented-visualization process or a virtual-visualization process. Views 1600 and 1700 display factory layouts. The views of the factory layouts may be entirely virtual (e.g., based on solid models) or a hybrid image formed of camera images and virtual images overlaid on the camera images. For example, FIG. 16 shows a drawing of a virtual aircraft 1620 based on a computer model overlaid on a camera image of a factory floor 1610.

FIG. 17 shows a camera image of a factory floor 1710 with a combination of camera images and virtual images of various tooling and equipment for manufacturing assemblies overlaid on the camera image of factory floor 1710. For example, equipment 1715 is shown as a virtual image overlaid on a camera image of factory floor 1710. Augmented-visualization views 1600 and 1700 may be used to assist an operator with determining space requirements as well as locations for robots, tooling, and heavy machinery. By using a camera image, such as a real-time image or a captured image, a model of the factory is not necessary to create a virtual factory layout. Using a real-time image also provides the advantage of incorporating any recent or current changes to the factory layout. In certain embodiments, the augmented-visualization views may be used to test load and unload paths for installing large parts including dynamic simulations of the loading and unloading.

Figure 18:
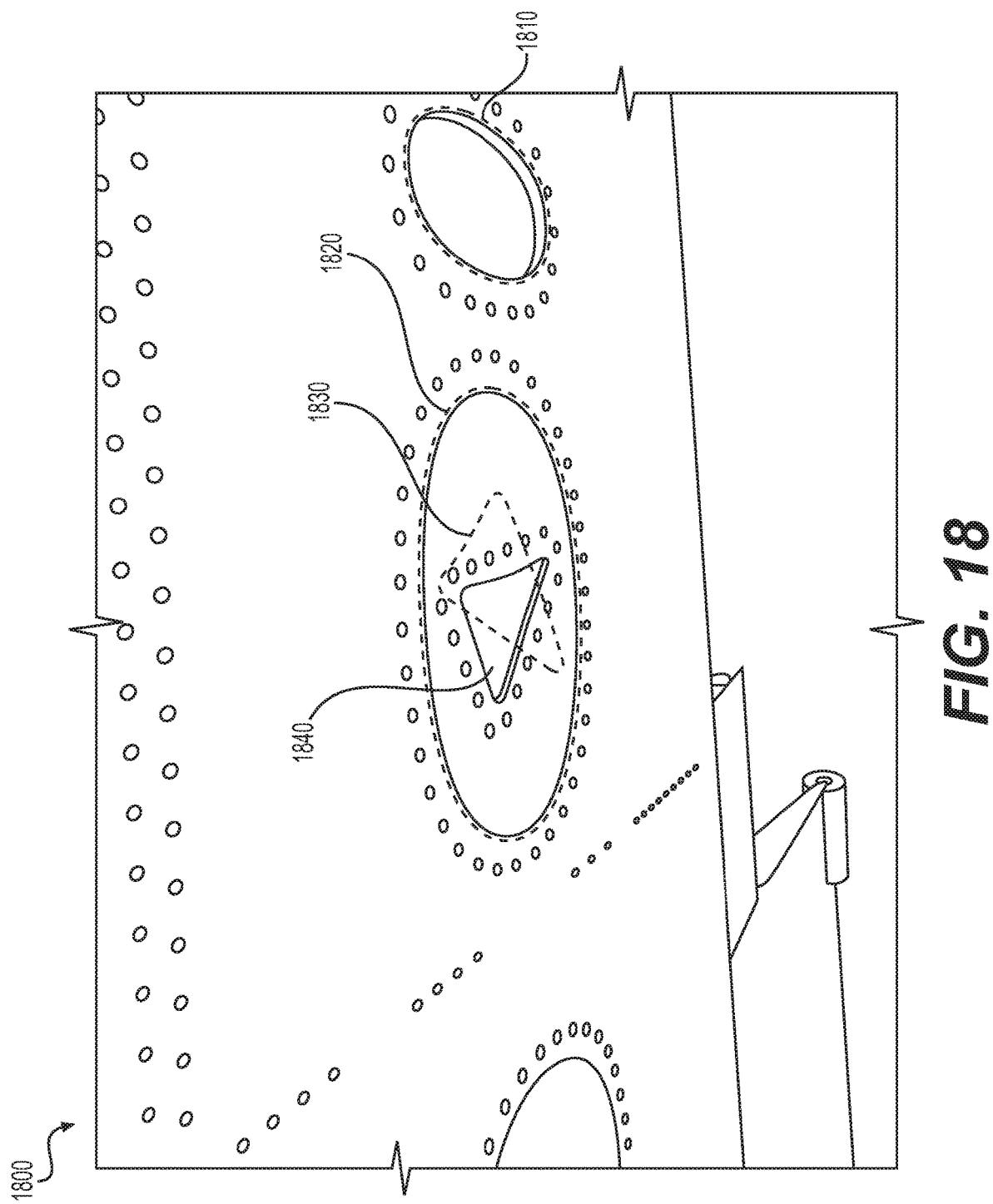
FIG. 18 illustrates an augmented-visualization view, which shows augmented-visualization indicators overlaid on a real-time image, in an embodiment.

FIG. 18 illustrates an exemplary augmented-visualization view 1800, which shows augmented-visualization indicators 1810, 1820, and 1830 overlaid on a real-time image. Augmented-visualization indicators 1810, 1820, and 1830 may be used for inspections and quality control, among other things. For example, indicator 1830 shows an intended orientation for a part 1840. The mismatch between indicator 1830 and part 1840 may be identified, either by the operator, or automatically by computer 110 via shape recognition to virtually identify parts. Shape recognition of parts may also be used to provide a visual comparison between a physical part and its virtual counterpart, which may assist in identification of correct parts. In certain embodiments, the augmented-visualization indicators may dynamically highlight a mismatch between an installed part and an intended orientation. For example, a virtual image may be used to dynamically illustrate how to reorient an incorrectly installed part.

Figure 19:
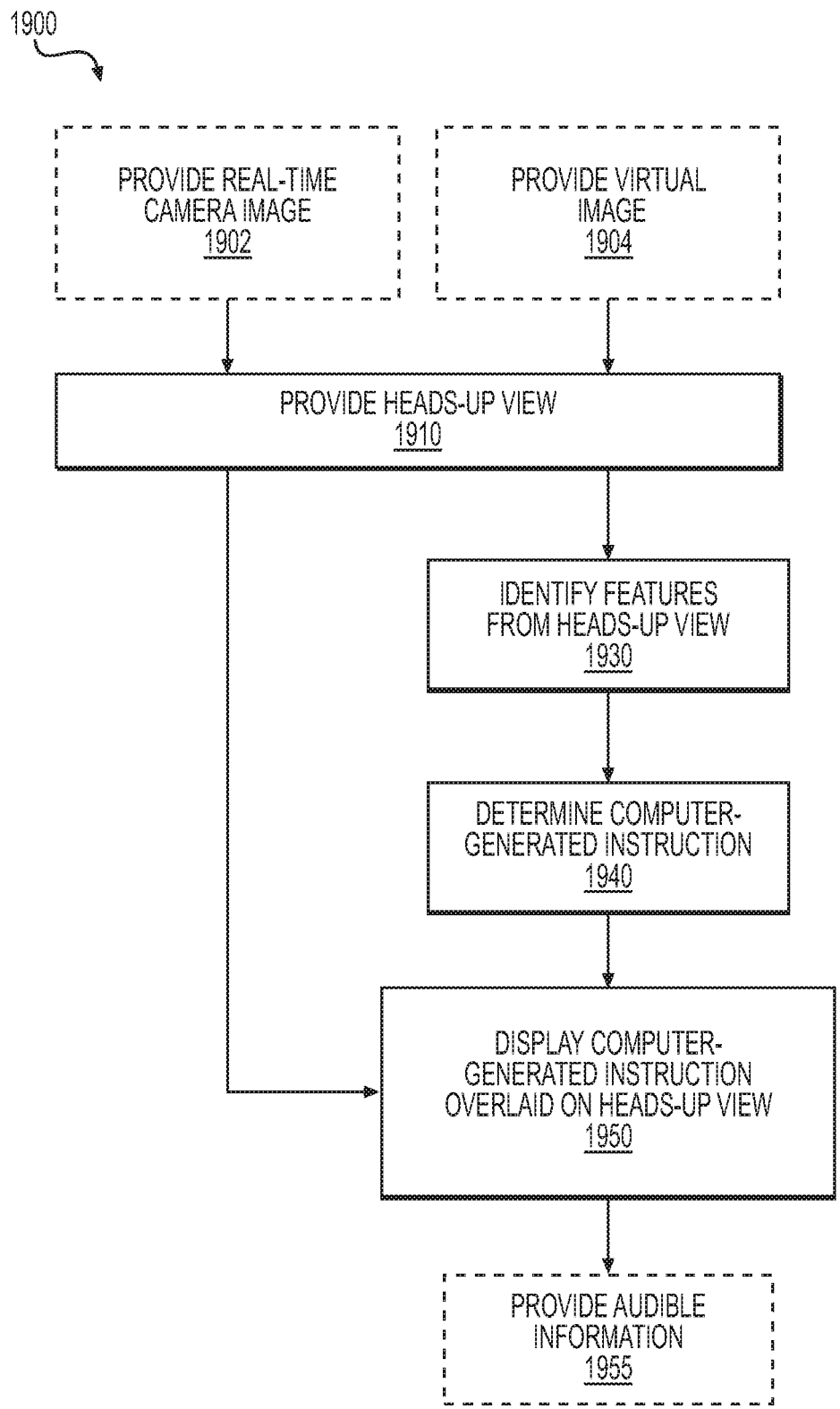
FIG. 19 is a block diagram of a virtual visualization method for manufacturing.

FIG. 19 is a block diagram of a virtual visualization method for manufacturing 1900. Method 1900 may be performed with augmented visualization system 100, FIG. 1, for example.

In an optional step 1902, a real-time camera image is provided. Step 1902 is an example of step 210, FIG. 2.

In an optional step 1904, a virtual image is provided from a computer model (e.g., a CAD model or a solid model). The virtual image may be a series of images presented as a video (e.g., for panning, rotating, and zooming the virtual image of the part). In certain embodiments where visualization device 130 is wearable, the virtual image may be adapted to appear as a live video presented as a heads-up view from the user's perspective. In other embodiments, a plurality views are provided from the computer model for display by visualization device 130. For example, an overhead view, an internal view, an exploded view, a partially see-through view, may all be provided sequentially or concurrently. Movement of the virtual image (e.g., for panning, rotating, and zooming) may be controlled by an operator (e.g., the user) or via preprogrammed software 115 of computer 110, FIG. 1, for example. Visualization device 130 may include VR goggles/glasses, computer monitors, televisions, touch screens, and mobile devices (e.g., smart phones and tablets) for displaying virtual views. In certain embodiments, a plurality of virtual views may be displayed on visualization device 130; alternatively, a plurality of visualization devices may be used to provide a plurality of views. Selection and enhancement (e.g., scrolling, panning, zooming) of views may be provided via user-input device 150, for example.

In a step 1910, a heads-up view is provided. In an example of step 1910, a heads-up view is provided to the user via the visualization device. In certain embodiments, the heads-up view is a real-time camera image (e.g., from step 1902), whereas in other embodiments, the heads-up view is a virtual image (e.g., from step 1904). In some embodiments, the heads-up view is a combination of the real-time camera image overlaid with features from the virtual image. For example, FIG. 16 shows a drawing of a virtual aircraft 1620 based on a computer model overlaid on a camera image of a factory floor 1610. In other words, view 1600, FIG. 16 provides a hybrid image of a camera image overlaid with one or more virtual images.

In a step 1930, features from a heads-up view are identified. In an example of step 1930, software 115 includes instructions for identifying features of the heads-up view and assisting the user in visualizing the features by highlighting or marking the features. The software instructions may include part identification (e.g., part numbers) and tool identification.

In a step 1940, a computer-generated instruction is determined. In an example of step 1940, computer 110 generates computer-generated instruction for conveying information to a user (e.g., imagery via visualization device 130 and/or audible instruction via audio device 140) for performing a manufacturing task.

In another example of step 1940, computer 110 generates a computer-generated virtual-visualization process. The virtual-visualization process enables the operator to prepare for specific tasks (e.g., rehearse sequences of steps) and visualize potential safety and ergonomic hazards prior to performing the tasks, including in advance of obtaining parts and tools required to perform the tasks.

In a step 1950, computer-generated instruction is overlaid on the heads-up view and displayed. In an example of step 1950, imagery generated by computer 110 is overlaid on the heads-up view and displayed via visualization device 130, FIG. 1. In certain embodiments, the computer-generated instruction includes virtual visualization processes, visual indicators, bright colors, flashing indicators, moving indicators, text labels, as well as other attention-grabbing means. Virtual visualization processes may depict parts and tools within a manufacturing environment including tooling, robots, heavy machinery, and building infrastructure. Embodiments of step 1950 are described above in connection with FIGS. 16-17.

In an optional step 1955, audible information is provided in coordination with the heads-up view. In an example of step 1955, audible information is provided to the user via audio device 140, FIG. 1. Audible information may include audible cues, instructions, reminders, and/or warnings. The audible information may be provided to the user in the form of speech, bells, dings, whistles and other attention-grabbing noises without departing from the scope hereof.

Method 1900 may be performed in an iterative or repetitive manner. For example, while performing a sequence of steps, the user may provide feedback to computer 110 and/or visualization device 130 via audio device 140 and/or user-input device 150, FIG. 1, such that the method is advanced to a subsequent step of the sequence based on the user feedback.

Augmented visualization system 100 and methods 200 and 1900 may be used to improve accuracy of build-time estimates by performing a virtual time study. For example, an assembly may be virtually built, or a part may be virtually installed using virtual parts and tools to determine time requirements based on a sequence of build/installation steps.

Augmented visualization system 100 and methods 200 and 1900 may be used to help prevent mistakes while performing manufacturing tasks. For example, part and tool recognition may be used to identify when an operator or robot has retrieved an incorrect tool or part based on the assembly protocol being followed and to notify the operator. Similarly, the operator may be notified for mis-location or incorrect installation of parts.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. An augmented visualization method for manufacturing, comprising:
    providing, using a camera, a real-time view of a part to a computer having non-transitory memory for storing software and a processor for executing software instructions;
    identifying, via the computer, features of the part from the real-time view based on the software instructions;
    providing a virtual image from a computer-aided-design (CAD) model of the part;
    displaying, on a visualization device, a hybrid view formed from the real-time view overlaid with the virtual image;
    determining a computer-generated visual instruction based on the features of the part identified from the real-time view and additional information from the CAD model of the part; and
    displaying the computer-generated visual instruction on the visualization device,
    wherein the computer-generated visual instruction comprises displaying a virtual manipulation of the part based on the CAD model overlaid on the real-time view; and
    wherein the hybrid view displays a virtual image of a through-hole on the real-time view of the part based on the additional information, and prior to drilling the through-hole, the computer-generated visual instruction virtually displays drilling the through-hole on the real-time view of the part.

2. The method of claim 1, wherein identifying features of the part further comprises analyzing the real-time view based on image processing software instructions.

3. The method of claim 2, further comprising training the image processing software instructions using images of parts and tools prior to manufacturing.

4. The method of claim 1, further comprising displaying the hybrid view of the part via the visualization device such that the computer-generated visual instruction overlays the real-time view of the part.

5. The method of claim 1, wherein displaying the computer-generated visual instruction comprises displaying steps for performing a manufacturing operation on the real-time view of the part being displayed.

6. The method of claim 1, further comprising providing a safety augmented-visualization view via the visualization device that includes a visual warning indicator to highlight a potential hazard to an operator.

7. The method of claim 1, further comprising generating virtual ergonomic-analysis imagery for displaying the computer-generated visual instruction on how to access the part ergonomically.

8. An augmented visualization system for manufacturing, comprising:
    a camera for generating a real-time image of a first part;
    a computer having non-transitory memory for storing software and a processor for executing software instructions, wherein the software instructions determine a computer-generated visual instruction based on features recognized from the real-time image;
    a computer model of an assembly, the assembly comprising the first part and at least one additional part, wherein information from the computer model is used by the software instructions to augment the computer-generated visual instruction;

a visualization device adapted for displaying the computer-generated visual instruction overlaid upon the real-time image of the first part; and wherein the computer-generated visual instruction comprises a virtual image overlaid upon the real-time image, the virtual image displaying the at least one additional part oriented for assembling with the first part; and wherein the virtual image comprises an exploded view of a part stack-up including the first part and the at least one additional part, wherein an individual part in the part stack up is highlighted corresponding to a current step of a build sequence to aid a process of assembling the assembly.

9. The system of claim 8, further comprising a user-input device communicatively coupled with the computer for receiving user inputs, wherein the user-input device comprises one or more of a touch screen, a joystick, a microphone, a computer mouse, and a keyboard.

10. The system of claim 8, further comprising an audio device having a microphone and a speaker for receiving and projecting audible sounds, respectively, wherein the software instructions determine a computer-generated audible instruction based on features recognized from the real-time image such that the audio device provides audible instructions via the speaker.

11. The system of claim 8, wherein the visualization device comprises a wearable device and the camera comprises a forward-facing camera coupled to the wearable device to provide the real-time image.

12. The system of claim 8, wherein the camera comprises a moveable camera adapted for moving to alter a vantage point via one or more of a gimbal, a swivel plate, a rail, and a stand having wheels.

13. The system of claim 8, wherein the visualization device comprises one or more of virtual-reality goggles, computer monitors, televisions, touch screens, and mobile devices.

14. A manufacturing method performed using an augmented-visualization image, comprising:
displaying a heads-up view of a part via a visualization device, wherein the heads-up view comprises a real-time image from a camera;
identifying, via a computer, features of the part based on the heads-up view;
providing, via the computer, information about the part from a computer solid model of the part;
overlaying the heads-up view with virtual images based on the computer solid model;
providing, via the computer, build instructions based on the features of the part, information about the part from the computer solid model, and the heads-up view of the part;
augmenting the heads-up view of the part with the build instructions, wherein the build instructions include a sequence of steps to perform on the part;
generating a virtual-visualization process overlaid on the heads-up view, wherein the virtual-visualization process displays virtually performing a step on the part based on the computer solid model prior to performing the step;
supplementing the build instructions with additional information and displaying the additional information overlaid on the heads-up view; and wherein the virtual images provide an exploded view of a stack-up of parts including the part and at least one additional component, wherein the part is highlighted for a corresponding step of the sequence of steps.

15. The method of claim 14, further comprising listing each step of the sequence of steps individually such that the sequence of steps is presented in a step-by-step manner corresponding to the heads-up view.

16. The method of claim 14, further comprising iteratively performing the steps of displaying the heads-up view, identifying features of the part, providing build instructions, and augmenting the heads-up view for repeating a portion of the build instructions.

17. The method of claim 14, further comprising selecting and enhancing views of the heads-up view via an input device.

18. The method of claim 14, further comprising identifying a feature of the part from an augmented-visualization indicator.

19. The method of claim 14, further comprising indicating a tool for performing a task indicated by a step of the build instructions.

20. The method of claim 14, further comprising verifying completion of a task by performing an inspection based on a real-time camera image of the part.

21. The method of claim 1, wherein, after drilling the through-hole, the computer-generated visual instruction virtually displays deburring the through-hole on the real-time view of the part.

22. The method of claim 21, wherein, after deburring the through-hole, the computer-generated visual instruction virtually displays installation of a virtual fastener in the through-hole on the real-time view of the part.

23. The method of claim 22, further comprising inspecting the installation of the fastener by analyzing, via the computer, the real-time view of the part after the fastener is installed.

24. The system of claim 8, wherein the virtual image dynamically illustrates a virtual path for installation of the first part within the assembly.

* * * * *